US009712542B1

(12) United States Patent
Brandwine

(10) Patent No.: US 9,712,542 B1
(45) Date of Patent: Jul. 18, 2017

(54) PERMISSIONS DECISIONS IN A SERVICE PROVIDER ENVIRONMENT

(71) Applicant: Amazon Technologies, Inc., Reno, NV (US)

(72) Inventor: Eric Jason Brandwine, Haymarket, VA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 14/317,524

(22) Filed: Jun. 27, 2014

(51) Int. Cl.
*H04L 29/06* (2006.01)
*H04L 12/24* (2006.01)
*H04L 29/08* (2006.01)

(52) U.S. Cl.
CPC ............ *H04L 63/108* (2013.01); *H04L 41/50* (2013.01); *H04L 63/08* (2013.01); *H04L 67/10* (2013.01)

(58) Field of Classification Search
CPC ................................. H04L 67/10; H04L 41/50
See application file for complete search history.

(56) References Cited

U.S. PATENT DOCUMENTS

| | | | | |
|---|---|---|---|---|
| 7,730,523 B1* | 6/2010 | Masurkar | ............. | H04L 63/083 726/4 |
| 8,234,640 B1* | 7/2012 | Fitzgerald | ............... | G06F 21/53 718/1 |
| 8,321,921 B1* | 11/2012 | Ahmed | .................... | G06F 21/00 726/5 |
| 8,959,195 B1* | 2/2015 | Niranjan | ............. | H04L 41/5009 709/223 |
| 9,069,979 B2* | 6/2015 | Srinivasan | ............... | G06F 21/62 |
| 9,166,992 B1* | 10/2015 | Stickle | ................ | H04L 63/1408 |
| 9,276,942 B2* | 3/2016 | Srinivasan | ....... | G06Q 10/06315 |
| 9,319,272 B1* | 4/2016 | Brandwine | ......... | H04L 41/0806 |
| 2003/0041113 A1* | 2/2003 | Larsen | ................. | G06Q 10/107 709/206 |
| 2003/0084171 A1* | 5/2003 | de Jong | .................. | G06F 21/33 709/229 |
| 2008/0098465 A1* | 4/2008 | Ramakrishna | .......... | G06F 21/10 726/5 |
| 2008/0275993 A1* | 11/2008 | Mohammed | ........... | G06Q 10/10 709/228 |

(Continued)

OTHER PUBLICATIONS

Cloud Service Provider Methods for Managing Insider Threats: Analysis Phase II, Expanded Analysis and Recommendations; Lori Flynn et al.; Jan. 2014; Software Engineering Institute.*

(Continued)

*Primary Examiner* — James Turchen
(74) *Attorney, Agent, or Firm* — Hogan Lovells US LLP

(57) ABSTRACT

Permissions can be delegated to enable access to resources associated with one or more different accounts, which might be associated with one or more different entities. Accordingly, approaches for delegating security rights and privileges for services and resources in an electronic and/or multi-tenant environment are provided. In particular, various embodiments provide approaches for dynamically determining and authorizing delegation of permissions to perform actions in, on, or against one or more secured accounts, where those accounts may be associated with a number of different entities and/or resource providers.

16 Claims, 7 Drawing Sheets

(56) References Cited

U.S. PATENT DOCUMENTS

| | | | |
|---|---|---|---|
| 2009/0089625 A1* | 4/2009 | Kannappan | G06Q 10/10 714/39 |
| 2011/0276674 A1* | 11/2011 | Jensen-Horne | G06F 9/5061 709/223 |
| 2012/0011077 A1* | 1/2012 | Bhagat | G06F 21/554 705/317 |
| 2012/0179824 A1* | 7/2012 | Jackson | G06F 9/5027 709/226 |
| 2013/0325927 A1* | 12/2013 | Corbett | G06F 17/30442 709/203 |
| 2013/0326637 A1* | 12/2013 | Fang | G06F 21/105 726/28 |
| 2014/0013447 A1* | 1/2014 | Hotti | G06F 21/6209 726/28 |
| 2014/0059226 A1* | 2/2014 | Messerli | G06F 9/546 709/226 |
| 2014/0075033 A1* | 3/2014 | Doering | H04L 41/5054 709/226 |
| 2014/0088979 A1* | 3/2014 | Garman | G06F 21/86 705/1.1 |
| 2014/0150066 A1* | 5/2014 | Chandolu | G06F 21/6218 726/4 |
| 2014/0172376 A1* | 6/2014 | Weiss | G06F 17/50 703/1 |
| 2014/0278623 A1* | 9/2014 | Martinez | G06F 8/36 705/7.12 |
| 2014/0278808 A1* | 9/2014 | Iyoob | G06Q 30/0206 705/7.35 |
| 2014/0289391 A1* | 9/2014 | Balaji | H04L 43/04 709/224 |
| 2014/0366093 A1* | 12/2014 | Oh | G06F 9/45533 726/3 |
| 2015/0067805 A1* | 3/2015 | Martin | H04W 12/06 726/7 |
| 2015/0074272 A1* | 3/2015 | Huang | H04L 41/50 709/225 |
| 2015/0163158 A1* | 6/2015 | Ryland | H04L 47/70 709/225 |
| 2015/0180872 A1* | 6/2015 | Christner | H04L 63/10 726/4 |

OTHER PUBLICATIONS

Tang, B., Li, Q. and Sandhu, R., Jul. 2013. A multi-tenant RBAC model for collaborative cloud services. In Privacy, Security and Trust (PST), 2013 Eleventh Annual International Conference on (pp. 229-238). IEEE.*

* cited by examiner

PERMISSIONS DECISIONS IN A SERVICE PROVIDER ENVIRONMENT

BACKGROUND

In recent years, an ever-increasing number of applications and services have been made available over networks such as cellular networks and the Internet. Due to this, an increasing number of content and service providers are turning to technologies such as remote resource sharing and cloud computing. Cloud computing, in general, is an approach to providing access to electronic resources through services, such as Web services, where the hardware and/or software used to support those services is dynamically scalable to meet the needs of the services at any given time. A user or customer of a service provider will typically rent, lease, or otherwise pay for access to resources through the cloud, and thus does not have to purchase and maintain the hardware and/or software to provide access to these resources.

In some cases, the customer may wish to delegate or share permissions or other access rights to with services and resources that reside within the service provider or in external networks. It is thus desirable to enable the customer to achieve such sharing of privileges in a trusted and secure manner.

BRIEF DESCRIPTION OF THE DRAWINGS

Various embodiments in accordance with the present disclosure will be described with reference to the drawings, in which.

DETAILED DESCRIPTION

Figure 1:
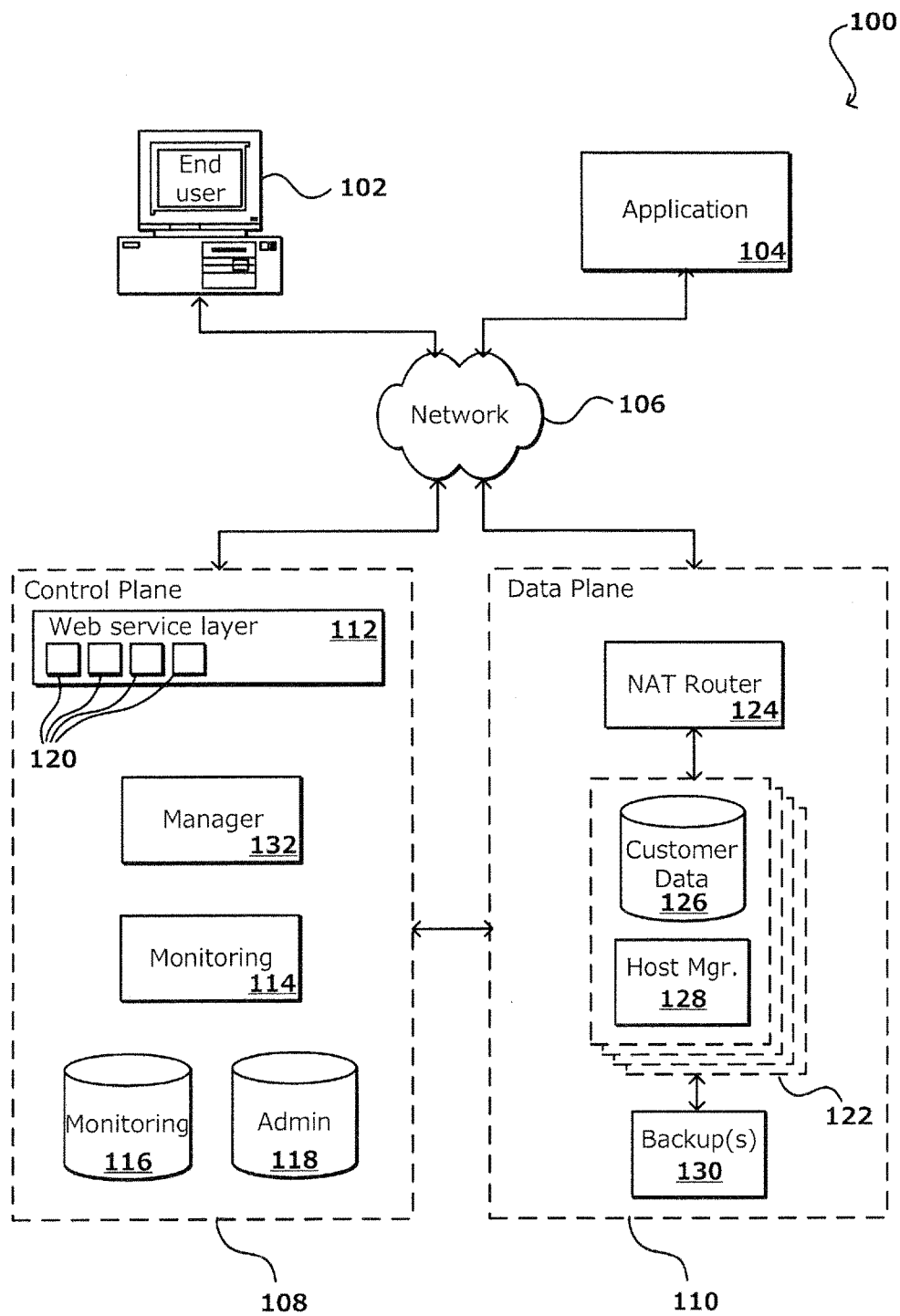
FIG. 1 illustrates an example environment in which aspects of the various embodiments can be implemented.

Systems and methods in accordance with the embodiments described herein overcome various deficiencies in existing approaches for delegating security rights and privileges for services and resources in an electronic and/or multi-tenant environment. In particular, the various embodiments provide approaches for dynamically determining and authorizing delegation of permissions to perform actions in, on, or against one or more secured accounts, where those accounts may be associated with a number of different entities and/or resource providers.

In accordance with various embodiments, a delegation profile can be associated with an appliance (e.g., a virtual machine that is pre-configured to provide a service) that allows a provider of the appliance to configure resources within accounts associated with customers of a service provider environment. In an example embodiment, the delegation profile can be enabled in response to a customer subscribing (e.g., selecting to use, purchasing, accessing, or otherwise acquiring the appliance) to the appliance. This allows the provider of the appliance to use the delegation profile to gain limited access to the customer's account to configure resources associated with the customer so that the appliance can be used.

In accordance with various embodiments, the appliance and the permissions granted by the delegation profile (or a plane English explanation of the actions that would be allowed under the delegation profile) can be listed in an electronic marketplace of the service provider. A customer can browse the electronic marketplace and select an appliance. In an embodiment, once the customer selects the appliance, a delegation profile can be created within the customer's account (or the appliance provider's account) that is associated with a policy that allows the appliance provider to access the customer's resources in a limited and restricted way. For example, suppose the appliance is a database appliance that needs an interface to a customer's virtual network. In this example, the delegation profile may give the appliance provider permissions to attach a network interface to the appliance. Additionally or alternatively, suppose the appliance performs network traffic monitoring. In this case, the delegation profile may give the appliance provider permission to perform certain actions within the customer's account, such as to configure the customer's virtual network topology so that data flowing in and out of the virtual network first goes through the appliance.

While in the example above the delegation profile was described as being listed with the appliance, in accordance with various other embodiments, the delegation profile can be generated at the time of purchasing or acquiring access to an appliance, when a provider of the appliance creates an account with a service provider, or at some other time. In accordance with various embodiments, the delegation profile can include information such as (a) a name (or other identifier), (b) a validation policy that specifies one or more security principals (e.g., application providers, users, etc.) that are permitted to assume the delegation profile or a reference identifier to a validation policy, and (c) an authorization policy specifying one or more allowable actions that a principal can perform within a customer's account or a reference identifier to such a policy. In some embodiments the allowable actions can be determined in accordance with one or more rules that map the operations that need to be performed within the customer's account to allowable actions that can be expressed in policy. In other situations, the permissions can be explicitly provided by the customer. In certain embodiments, the permissions can be a set of default permissions required by the service or application.

In the situation where a delegation profile has been determined, created, or otherwise associated with an appliance, permission can be granted to the appliance provider to use the delegation profile to configure resources within the customer's account. For example, in accordance with an embodiment, the delegation profile can be set by the appliance provider. For example, the appliance provider can create the delegation profile and submit the delegation profile to the service provider. In accordance with some embodiments, when the appliance is acquired by the customer, the delegation profile can appear in the customer's account with the service provider and a reference can appear in the appliance provider's account. Alternatively, the reference can appear in the appliance provider account and not in the customer's account. In certain embodiments, a read-only version of the delegation profile can be placed in the appliance provider account. It should be noted that other arrangements are possible in accordance with various embodiment and the described approaches are example approaches.

In an example embodiment, the delegation profile can be used by principals listed in it to obtain credentials that enable limited access to the customer's account. For example, when an appliance provider wants to configure the customer's resources, the appliance provider can send a request to obtain access under the delegation profile to a security service of the service provider. The security service can verify that the appliance provider can use the delegation profile by, for example, determining that the appliance provider is listed as authorized to use the profile and checking the status of the customer's account to see if the customer has subscribed (e.g., running the appliance, purchasing the appliance, adding the appliance to a list of instances associated with the customer account, etc.) to the appliance. If the appliance provider is authorized and the customer has subscribed to the appliance, a security token service associated with the security service can provide the appliance provider with credentials that enable the appliance provider to obtain limited access to the account of the customer. As described in more detail in subsequent paragraphs, in some embodiments, the credentials can be limited to a period of time, such as 10 minutes, an hour, a week, or a length of time the customer has access to the appliance.

FIG. 1 illustrates an example of an electronic resource environment 100 that can be used in accordance with various embodiments. As described, various embodiments provide approaches for dynamically determining and authorizing delegation of permissions to perform actions in, on, or against one or more secured accounts, where those accounts may be associated with a number of different entities and/or resource providers. The secured accounts allow for secured access to resources provided by the resource environment. The resources can be accessed by a user or customer of the resource environment or by a third party (e.g., an appliance provider) on behalf of the customer. Environment 100 is an example of such an electronic resource environment. In this example, a computing device 102 for an end user is shown to be able to make calls through at least one network 106 (e.g., the Internet, a cellular network, a wireless network, a local area network (LAN), etc.) into a control plane 108 to perform a task such as to provision a data repository or launch a virtual machine in a data plane 110. The user or an application 104, for example, can access the repository and/or virtual machine directly through an interface of the data plane 110. While an end user computing device and application are used for purposes of explanation, it should be understood that any appropriate user, application, service, device, component, or resource can access the interface(s) of the control plane and/or data plane as appropriate in the various embodiments. Further, while the components are separated into control and data "planes," it should be understood that this can refer to an actual or virtual separation, logically or geographically, of at least some resources (e.g., hardware and/or software) used to provide the respective functionality.

The control plane 108 in this example is essentially a virtual layer of hardware and software components that handles control and management actions, such as provisioning, instantiating, launching, scaling, replication, etc. The control plane in this embodiment includes a Web services layer 112, or tier, which can include at least one Web server, for example, along with computer-executable software, application servers, or other such components. The Web services layer also can include a set of APIs 132 (or other such interfaces) for receiving Web services calls or requests from across the at least one network 106. Each API can be provided to receive requests for at least one specific action to be performed with respect to the data environment. Upon receiving a request to one of the APIs, the Web services layer can parse or otherwise analyze the request to determine the steps or actions needed to act on or process the call. For example, a Web service call might be received that includes a request to launch a virtual machine. In this example, the Web services layer can parse the request to determine the type of virtual machine to be created, the type of hardware requested (if any), or other such aspects. Information for the request can be written to an administration ("Admin") data store, or other appropriate storage location or job queue, for subsequent processing.

A Web service layer in one embodiment includes a scalable set of customer-facing servers that can provide the various control plane APIs and return the appropriate responses based on the API specifications. The Web service layer also can include at least one API service layer that in one embodiment consists of stateless, replicated servers which process the externally-facing customer APIs. The Web service layer can be responsible for Web service front end features such as authenticating customers based on credentials, authorizing the customer, throttling customer requests to the API servers, validating user input, and marshalling or unmarshalling requests and responses. The API layer also can be responsible for reading and writing configuration data to/from the administration data store, in response to the API calls. In many embodiments, the Web services layer and/or API service layer will be the only externally visible component, or the only component that is visible to, and accessible by, customers of the control service. The servers of the Web services layer can be stateless and scaled horizontally as known in the art. API servers, as well as the persistent data store, can be spread across multiple data centers in a region, for example, such that the servers are resilient to single data center failures. Functions or configurations of the APIs or other such components can be managed by at least one system management component 114, or other such system or service.

The control plane 108 in this embodiment includes at least one host monitoring component 116. The host monitoring component can comprise any appropriate combination of hardware and/or software including instructions for monitoring aspects of the data plane. For example, the host monitoring component can include a dedicated host machine, process distributed across a number of machines, or a Web service, among other such options. When a virtual machine ("VM") is created in the data plane, information for the VM can be written to a data store in the control plane, such as a monitoring data store 120. It should be understood that the monitoring data store can be a separate data store, or can be a portion of another data store such as a distinct set of tables in an Admin data store 122, or other appropriate repository. A host monitoring component 116 can access the information in the monitoring data store to determine active VMs, resource instances, or other such resources or components 134 in the data plane 110. A host monitoring component also can perform other tasks, such as collecting log and/or event information from multiple components of the control plane and/or data plane, such as the Web service layer and various host managers 128. Using such event information, the monitoring component can expose customer-visible events, for purposes such as implementing customer-facing APIs. A monitoring component can constantly monitor the health of all the running repositories and/or instances for the control plane, detect the failure of any of these instances, and initiate the appropriate recovery process(es).

Each resource instance 134 (e.g., data instance or virtual machine) in the data plane can include at least one data store 126 and a host manager component 128 for the machine providing access to the data store. A host manager in one embodiment is an application or software agent executing on an instance and/or application server, such as a Tomcat or Java application server, programmed to manage tasks such as software deployment and data store operations, as well as monitoring a state of the data store and/or the respective instance. A host manager in one embodiment listens on a port that can only be reached from the internal system components, and is not available to customers or other outside entities. In some embodiments, the host manager cannot initiate any calls into the control plane layer. A host manager can be responsible for managing and/or performing tasks such as setting up the instances for a new repository, including setting up logical volumes and file systems, installing database binaries and seeds, and starting or stopping the repository. A host manager can monitor the health of the data store, as well as monitoring the data store for error conditions such as I/O errors or data storage errors, and can restart the data store if necessary. A host manager can also perform and/or mange the installation of software patches and upgrades, as well as updates to configuration (e.g., specific virtual machine images) or firmware, etc. A host manger also can collect relevant metrics, such as may relate to CPU, memory, and I/O usage.

The host monitoring component 116 in the control plane 108 can communicate periodically with each host manager 128 for monitored instances, such as by sending a specific request or by monitoring heartbeats from the host managers, to determine a status of each host. In one embodiment, the monitoring component includes a set of event processors (or monitoring servers) configured to issue commands to each host manager, such as to get the status of a particular host and/or instance. In at least some embodiments, a deployment monitor component 118 can also communicate with hosts, instances, and other such components to attempt to determine when versions or configurations are deployed or updated, when communications are sent, and other such information. A deployment monitor can be part of, or separate from, the host monitor, as may both be provided as part of a monitoring service of the control plane.

As discussed, once an instance is provisioned and a user is provided with a DNS address or other address or location, the user can send requests "directly" to the data plane 110 through the network using a Java Database Connectivity (JDBC) or other such client to directly interact with that instance. In one embodiment, the data plane takes the form of (or at least includes or is part of) a computing cloud environment, or a set of Web services and resources that provides data storage and access across a "cloud" or dynamic network of hardware and/or software components. A DNS address is beneficial in such a dynamic cloud environment, as instance or availability failures, for example, can be masked by programmatically remapping a DNS address to any appropriate replacement instance for a use. A request received from a user 102 or application 104, for example, can be directed to a network address translation (NAT) router 124, or other appropriate component, which can direct the request to the actual instance or host corresponding to the DNS of the request. As discussed, such an approach allows for instances to be dynamically moved, updated, replicated, etc., without requiring the user or application to change the DNS or other address used to access the instance. As discussed, each instance can include a host manager 128 and a data store 126, for example, and can have at least one backup instance or copy in persistent storage 130. Using such an approach, once the instance has been configured through the control plane, a user, application, service, or component can interact with the instance directly through requests to the data plane, without having to access the control plane 108. For example, the user can directly issue structured query language (SQL) or other such commands relating to the data in the instance through the DNS address. The user would only have to access the control plane if the user wants to perform a task such as expanding the storage capacity of an instance. In at least one embodiment, the functionality of the control plane 108 can be offered as at least one service by a provider that may or may not be related to a provider of the data plane 110, but may simply be a third-party service that can be used to provision and manage data instances in the data plane, and can also monitor and ensure availability of those instances in a separate data plane 110.

In accordance with various embodiments, a service provider may desire to ensure that a resource infrastructure is secure and that their customers' services and data are protected. Similarly, the customer of the service provider needs to ensure that the provider has taken the proper security measures to protect their information against unauthorized use or access from end users or various other third parties. Furthermore, in some cases, the customer may wish to delegate or share permissions or other access rights to with services and resources that reside within the service provider or in external networks. Accordingly, various embodiments provide approaches for dynamically determining and authorizing delegation of permissions to perform actions in, on, or against one or more secured accounts, where those accounts may be associated with a number of different entities and/or resource providers.

Figure 2:
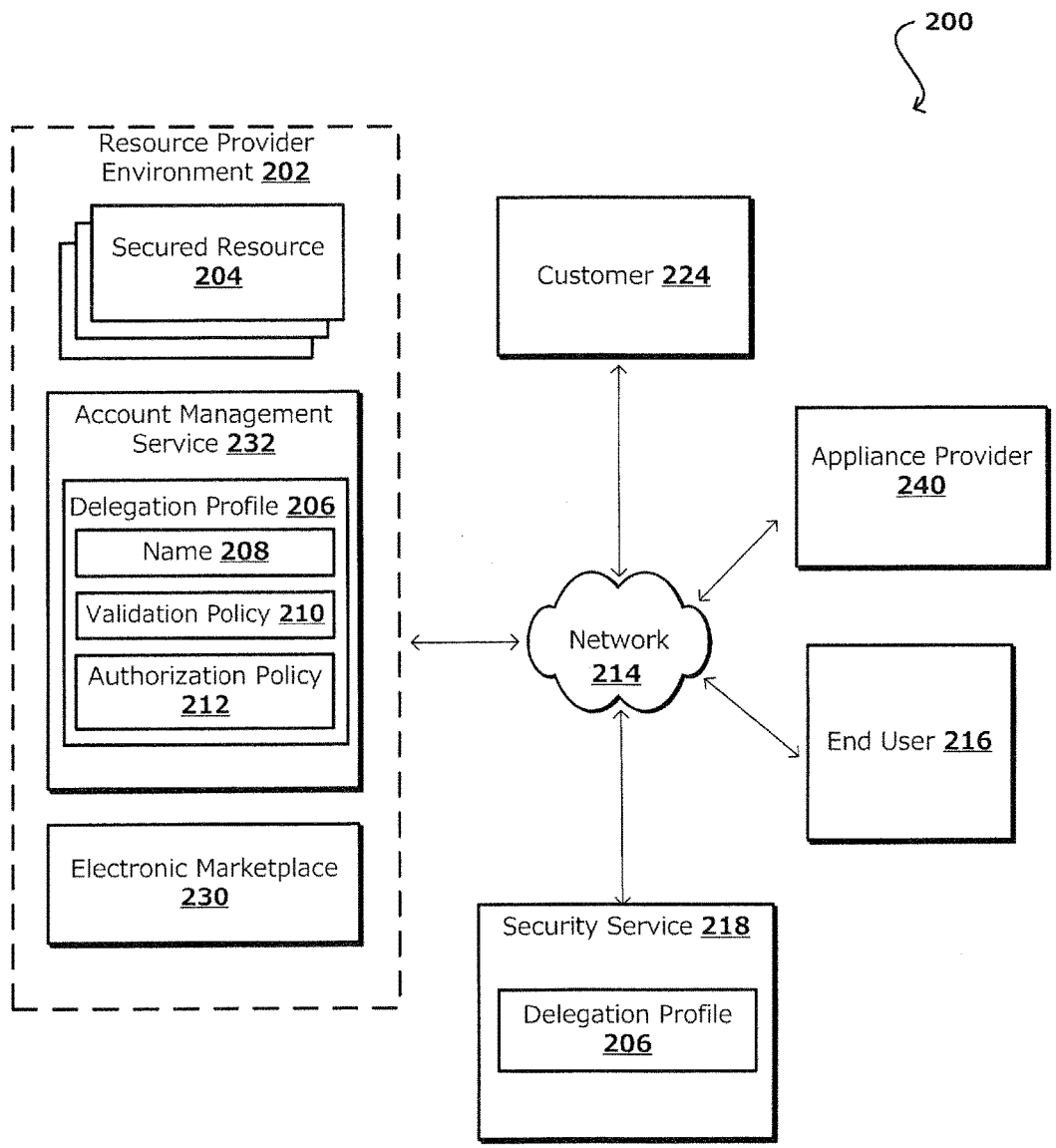
FIG. 2 illustrates another example environment in which aspects of the various embodiments can be implemented.

FIG. 2 is a high level illustration of an environment 200 in which a service provider system can utilize a delegation profile or other such information that can be generated, selected, or applied for one or more accounts of at least one customer, where each customer has at least some level of access to one or more resources managed and/or offered by the system, in accordance with various embodiments. As illustrated, a service provider environment 202 can include one or more secured resources 204 of various types, as may be used to support various services and/or applications. These resources can include physical and/or virtual resources, such as application or data servers or instances (e.g., virtual machines), virtual networks, databases, storage servers, data stored in database or storage services, among other such resource types. A customer 224 of the resource provider environment 202 can obtain an account with the resource provider environment, enabling the customer 224 to access one or more of the secured resources 204 across at least one appropriate network 214. The customer in some embodiments can utilize these resources to support appliances, applications, and other services.

An appliance developer, service provider, or party might provide an appliance, application, or other service that can be downloaded and executed or otherwise accessed by the customer 224. In accordance with an embodiment, an appliance can include a machine image that can include software such as security software, business intelligence software, databases, storage backup, etc. The machine image can be used by a compute service to launch one or more instances of the machine image. In accordance with certain embodiments, the application or service can be downloaded or otherwise accessed from an electronic marketplace 230 and can be provided by appliance provider 240. The appliance provider can be, for example, affiliated or unaffiliated with the service provider. For example, in accordance with an embodiment, the appliance is provided by the service provider and in various other embodiments the appliance is provided by a provider unaffiliated (or in some instances affiliated) with the service provider. In various embodiments, the appliance may need to utilize resources associated with the customer of the resource provider environment. In order to enable the appliance to obtain access to those resources, but be restricted to the amount or type of access that can be obtained, the developer can request permissions (or implicitly be granted access rights) or other access rights to access at least a portion of the resources associated with a customer of the resource provider environment.

For example, in accordance with various embodiments, when a customer subscribes to an appliance, subscribing can grant permission to at least the appliance provider and/or resource provider system to access, configure, and utilize certain resources associated with the customer's account. As described, an electronic marketplace 230 can provide one or more appliances (e.g., services, applications, or the like). The appliances can be created by a resource provider system or an application provider (e.g., a third party application provider). In accordance with various embodiments, the appliance may require access to one or more resources associated with a customer account. Once the appliance is selected (e.g., the customer subscribes to the appliance or adds the appliance to a list of instances the customer can launch), the customer can be presented a service policy. In various embodiments, the policy can be listed in the electronic marketplace 230 such that the user can view or otherwise access the service policy prior to selecting the appliance. In this way, the customer can see what access is required or otherwise needed by the appliance provider prior to subscribing the appliance.

In accordance with various embodiments, the policy can specify, for example, permissions or other access rights requested by the appliance provider. In certain embodiments, the policy can be a set of default permissions that cannot be adjusted. In various other embodiments, the customer can adjust and modify the default permissions. This can include updating certain fields of the policy as may include filling in blanks, selecting from a drop down menu, etc. Additionally, the fields can be automatically updated using account information for the customer. For example, in the situation where the policy is mandatory, when the customer subscribes to the appliance, the appliance provider can be granted the right to, for example, plug the appliance into the customer's virtual network. In the situation where the policy is advisory, the customer may decide that they do not want the appliance provider to plug into their network; rather, the customer would rather the appliance provider plug into a particular subnet in a particular virtual network. In some situations, the policy is templatized. For example, launching or otherwise using the appliance can grant the appliance provider permissions to plug into a predetermined network provided by the customer. If the customer does not provide a network, in an example, default options can be used.

Accordingly, in response to the user subscribing to the appliance (e.g., by selecting the appliance, agreeing to the terms and conditions associated with using the appliance, paying for the appliance, or some other arrangement such as the customer accepting the service policy and/or other conditions), a delegation profile associated with a policy including at least one permission can be made available to the appliance provider. For example, when a customer purchases access to the appliance, the access can implicitly grant permission to the appliance provider to access and utilize certain resources associated with the customer's account. In accordance with an embodiment, the permissions for use by the appliance can be included in a delegation profile 206 that can be created or otherwise associated with the account for the customer. The delegation profile can be maintained by the resource provider environment on behalf of the customer within the account management service 232 or the security service 218, and the delegation profile can designate one or more principals (e.g., the appliance, service provider, etc.) of the customer 224 and a set of the shared resources (e.g., 204) that those principals can access and use. For example, when the customer adds the appliance, the electronic marketplace 230 can be configured to send a message to an account management service 232 when the customer selects the appliance indicating that the customer has purchased, subscribed to, or is using the appliance. The account management service 232 can add information to a database indicating that the customer has added the appliance to his or her account; and add the delegation profile to the account of the customer (or in certain embodiments the account of the appliance provider).

In accordance with an embodiment, an example delegation profile 206 includes a name 208 or identifier, at least one validation policy 210, and at least one authorization policy 212. The name 208 can be a string or any other identifier that is used to refer to the delegation profile. The validation policy 210 specifies which security principals, external entities (e.g., third party appliance providers, etc.), or other types of users that are allowed to utilize the delegation profile to perform various actions under the delegation profile. As discussed, the external entities, appliance providers, etc. can reside externally with respect to the customer and/or the account. In addition, the one or more authorization policies 212 can indicate which specific actions the various principals are allowed to perform (e.g., run instances, read or modify data, access other secured resources in the account etc.).

In accordance with an embodiment, as described, an entity can be specified in the validation policy in response to an indication to access an appliance. In accordance with various embodiments, the authorization policy can be based at least in part on the permissions or access rights required by the appliance provider to enable the appliance within the customer account. As described, the amount and/or type of access can be configurable, as may be determined by any of the customer, the appliance provider, or the service provider, among other such entities.

In accordance with various embodiments, the appliance can be associated with a delegation profile. In this situation, when a customer adds the appliance to his or her account, the delegation profile is made active within the customer's account, so that it can be used by the appliance provider. For example, permission can be granted to the appliance provider to use the delegation profile to configure resources within the customer's account. In certain embodiments, the customer can specify or create a delegation profile for each appliance, service provider, etc., and the delegation profile can be provided to a respective appliance provider.

In each case, the delegation profile might have to specify a subset of the access allowed to the appliance provider under the customer account. In this way, it is possible that requests from the appliance provider are received under one or more different types, amounts, or levels of access. Levels of access can include, for example, a first type of access when accessing the secured resources according to a default licensing template. The appliance provider also might be able to obtain access, which might be more restrictive when the customer has specified more restrictive access. For example, the customer might grant read and write access to data stored by the secured resources 204 under a delegation profile. In each of these cases, the set of shared resources that the principals can access and use can include and/or be based at least in part on the permissions allowed for in the policy. In at least some embodiments, the delegation profile associated with the appliance provider might differ from a delegation profile created by the customer and for the customer, and in at least some embodiments, can include a subset of the access as designated by the customer. As an example, at least the appliance provider might be able to only configure the appliance. A delegation profile for the customer, however, might enable the customer to access any or all of the data stored under the customer account.

In accordance with various embodiments, the delegation profile provides for permissions that permit the appliance provider to perform actions on resources 204 associated with the account, subject to the permissions specified in the authorization policy 212. In accordance with an embodiment, a customer 224 associated with an account is able to provide the delegation profile to an appliance provider. For example, a reference to the delegation profile can be provided to the appliance provider when the customer purchases an appliance from the electronic marketplace 230. For example, the reference can be stored in a database of the account management service 232. The appliance provider 240 can access a web console that interlaces with the account management service 232 and displays the reference. In an alternative embodiment, the appliance provider 240 can obtain the reference by making a web service request to an application program interface of the account management service 232 to obtain the reference.

In accordance with an embodiment, if an appliance provider is provided with a reference to the delegation profile, the appliance provider can use the reference to obtain a set of credentials for performing certain actions in the account. Accordingly, the appliance provider can then obtain credentials to act as an authorized user under the account by way of the delegation profile 206. The appliance provider may use the reference to the delegation profile 206 and request the credentials from a security service 218, federation system, or other authorized entity that has access to a copy of the delegation profile 206. The security service (or other identity or federation management entity) can verify whether the validation policy defined in the delegation profile properly identifies the appliance provider as being allowed to assume the delegation profile. If the appliance provider is verified, the security service can check whether the customer still has an active subscription to the appliance (e.g., whether the appliance is still within the account of the customer). For example, the security service can send a request to the account management service 232 for information indicating whether the customer has a valid subscription to the appliance or has the appliance in their account. If the appliance hasn't been removed or the subscription canceled, the security service 218 can issue the set of credentials that can be used by the appliance provider to perform actions on resources 204 associated with the account, subject to the permissions specified in the authorization policy 210.

In an example embodiment, a subscription can be valid, for example, when a customer has paid for or otherwise been granted a license. For example, a customer may pay a subscription fee for a daily, monthly, yearly, or some duration of time subscription. In the situation where the customer does not have a valid subscription or license, for example because no fee has been received or the customer has canceled the subscription, access to resources associated with the customer can be denied. Advantageously, since the service provider can provide a marketplace that enables access to one or more appliances that can be provided by one or more appliance providers or other providers, the service provider can manage access to resources such as by determining whether a subscription is valid before granting access to resources associated with a customer. This can provide a more efficient control model over the actions and principals that are able to access the resources of the account under the assumption of the delegation profile.

Once it is determined that the customer has a valid subscription the appliance can submit requests to the customer's secured resources in the provider environment. The request can include a copy of the credentials and, in some embodiments, information such as an identifier for the appliance, an identifier for a delegation profile to be applied, or other such information. When the request is received to the provider environment, the security service 218 can obtain all the policy documents applicable to the request (e.g., any policy set by the customer as well as the policy associated with the delegation profile) to determine whether the appliance provider 240 has authorization to perform the action within the account. In the instance that the policy associated with the delegation profile allows the action, the security service 218 can permit the appliance provider 240. In an example embodiment, instead of checking to see whether the customer has a valid subscription before issuing the credential, the check can be performed at the time of the request. For example, the security service 218 can receive the delegation profile and within the profile can be a condition that the customer have a valid subscription to the appliance. The security service 218 can send a request to the account management service 232 for status and the account management service 232 can respond with an acknowledgment as to whether the customer has a subscription. The security service 218 can use this information to determine whether to grant or deny the request.

For example, in accordance with various embodiments, a request to enable a first party to access, configure, and utilize certain resources associated with a second party can be received. In accordance with various embodiments, the first party can correspond to an appliance provider, third party application/service provider, or some other entity. The second party can correspond to a customer. The customer can have an account with a provider of the virtual infrastructure (e.g., the resources of the customer, such as virtual machines, databases, virtual networks, etc.). A request, by the first party, to make the change in virtual infrastructure associated with the second party can be received. In certain embodiments, the request can be received by a provider of the virtual infrastructure. Whether the first party is permitted by the second party to configure the appliance so that it can run on the virtual infrastructure of the second party can be validated. For example, a security service of the provider of the virtual infrastructure can validate the request. Thereafter, credentials can be provided to the first party for access to the virtual infrastructure associated with the second party, the access being subject to one or more permissions associated with a delegation profile. For example, in accordance with an embodiment, at least one of denying the request or processing the request can be performed based at least in part on the delegation profile. In this situation, one or more permissions in the delegation profile can be used to deny or perform the request. In various embodiments, a type of access to the virtual infrastructure granted to the first party can be different from a type of access granted to the second party and in accordance with an embodiment, the one or more permissions of the delegation profile are restricted to a scope that is less than or equal to permissions of the second party.

Figure 3:
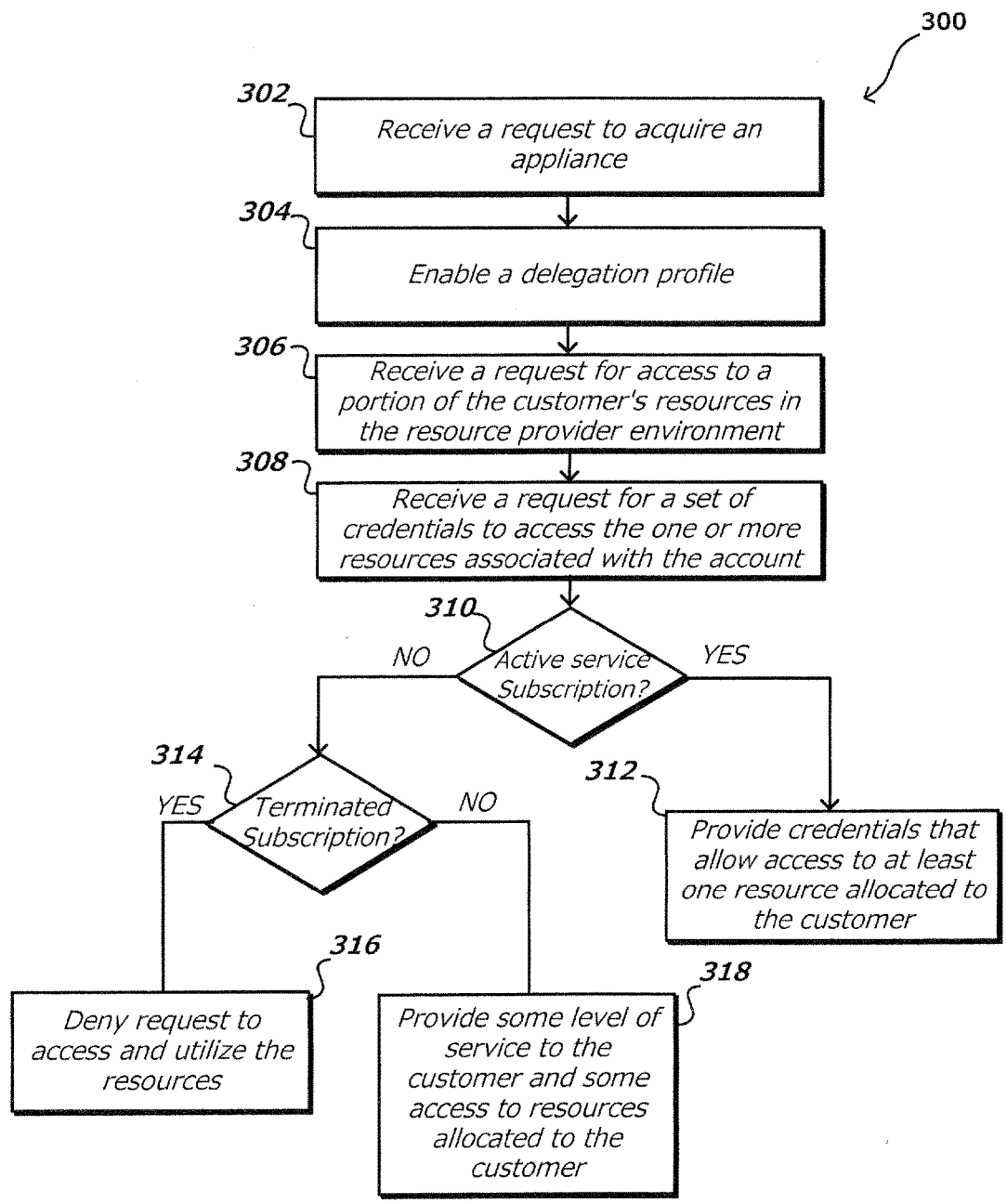
FIG. 3 illustrates an example process for enabling access to resources in accordance with various embodiments.

In accordance with various embodiments, a request to access the appliance by the second party can be received and in response to the request a license to use the appliance for at least a period of time can be enabled. In various embodiments, an indication that the second party is not permitted to access the appliance can be received. In response to such an indication, at least one of denying the first party access to the virtual infrastructure associated with the second party or disabling access to the appliance by the second party can be performed. The indication can include, for example, at least one of an indication that the second party no longer desires to use the appliance or an indication that a license period associated with a license to use the appliance has expired FIG. 3 illustrates an example process 300 that can be used to delegate permissions to manipulate resources of a customer in accordance with various embodiments. It should be understood that, for any process discussed herein, there can be additional, fewer, or alternative steps, performed in similar or different orders, or in parallel, within the scope of the various embodiments unless otherwise stated. As described, various embodiments provide approaches for dynamically determining and authorizing delegation of permissions to perform actions in, on, or against one or more secured accounts, where those accounts may be associated with a number of different entities and/or resource providers.

A request can be received 302 from a customer to acquire an appliance. In various embodiments, the request can be to subscribe to an appliance listed in an electronic marketplace operated by a service provider. For example, in accordance with various embodiments, an appliance developer might provide an appliance that can be run within the service provider environment and used with other resources of the customer. The customer can acquire the appliance by selecting the appliance in the electronic marketplace and a license to use the appliance may be stored in an account of the customer. The use can be for a determined period of time.

In various embodiments, the appliance may need to utilize resources associated with the customer of the service provider. As described, the customer can have an account maintained by a resource provider of the one or more resources accessible to the customer as determined by one or more terms of the account. For example, in accordance with various embodiments, a resource provider environment can include one or more secured resources of various types, as may be used to support various services and/or applications. These resources can include physical and/or virtual resources, such as application or data servers or server instances, among other such resource types. A customer of the resource provider environment can obtain an account with the resource provider environment, enabling the customer to access one or more of the secured resources across at least one appropriate network. The customer in some embodiments can utilize these resources to support applications and services and other appliances. In order to enable the appliance to obtain access to those resources, but be restricted to the amount or type of access that can be obtained, the developer of the appliance can be granted access rights to access at least a portion of the resources associated with a customer of the resource provider environment.

In accordance with an embodiment, in response to receiving the request to acquire the appliance, a delegation profile that includes an authorization policy can be enabled 304. In accordance with various embodiments, the delegation profile can include or be associated with an authorization policy, that specifies one or more permissions for accessing and utilizing one or more resources associated with the customer, the customer having an account maintained by a provider of the one or more resources accessible to the customer. As described, when a customer indicates a desire to acquire an appliance, the request to acquire the appliance can implicitly grant permission to at least the appliance provider to access and utilize certain resources associated with the customer's account. A request can be received 306 from the appliance provider for access to at least a portion of the customer's resources in the resource provider environment. A request for a set of credentials to access the one or more resources associated with the account can be received 308, the request including a reference to the delegation profile.

The security service of the service provider can verify 310 whether the customer has an active subscription to the appliance. For example, in accordance with various embodiments, the check to see if the customer has a subscription can be placed in the delegation profile. In this way, when the appliance service attempts to access resources associated with the customer, the service provider environment or some other system can check the subscription status, along with other data to determine whether to issue credentials. If the customer subscription is expired, for example, then system will deny the request. For example, in the situation the customer does have an active subscription to the appliance, the appliance provider can be provided 312 credentials that allow the appliance service provider to access to at least one resource allocated to the customer, as determined by the determined delegation policy. In the situation, the customer does not have an active subscription (or a limited subscription) to the appliance, a determination can be made as to the state of the customer's service subscription (e.g., default, terminated, etc.) and based at least in part on the state of the customer's subscription the customer can be associated with one of one or more levels of service subscription. In accordance with various embodiments, each level of service subscription may grant the appliance provider some level of access to resources allocated to the customer.

For example, in the situation where it is determined that the customer does not have an active subscription to the appliance, a determination 314 can be made as to the customer's service subscription level. In accordance with an embodiment, service subscription levels can include, for example, a service subscription that is active status, a service subscription that is in default status, or a service subscription that is in a terminated status. In the situation that it is determined that the customer's service subscription is terminated, the request to access and utilize the resources can be denied 316.

In the situation that it is determined that the customer's service subscription is in, for example, a default status, the appliance provider may be provided 318 some level of access to resources allocated to the customer and/or may provide some level of service to the customer. In accordance with an embodiment, the customer's subscription may be in a default status because, for example, the customer has missed a payment, has not agreed to a service policy (or an updated service policy), or for some other reason. In this situation, the customer may be able to utilize the appliance for a determined period of time, but may receive some or no support. In some situations, the customer may be only be able to access a portion (or none) of the functions of the appliance. In certain embodiments, in the situation where the customer's service subscription is in the default status, the appliance provider's access to the resources allocated to the customer may be restricted by the service provider environment. For example, the appliance provider's access may be contingent on the customer having an active subscription and in the situation where the subscription is not active, the appliance provider may be allowed access to a portion (or none) of the resources allocated to the customer.

Figure 4:
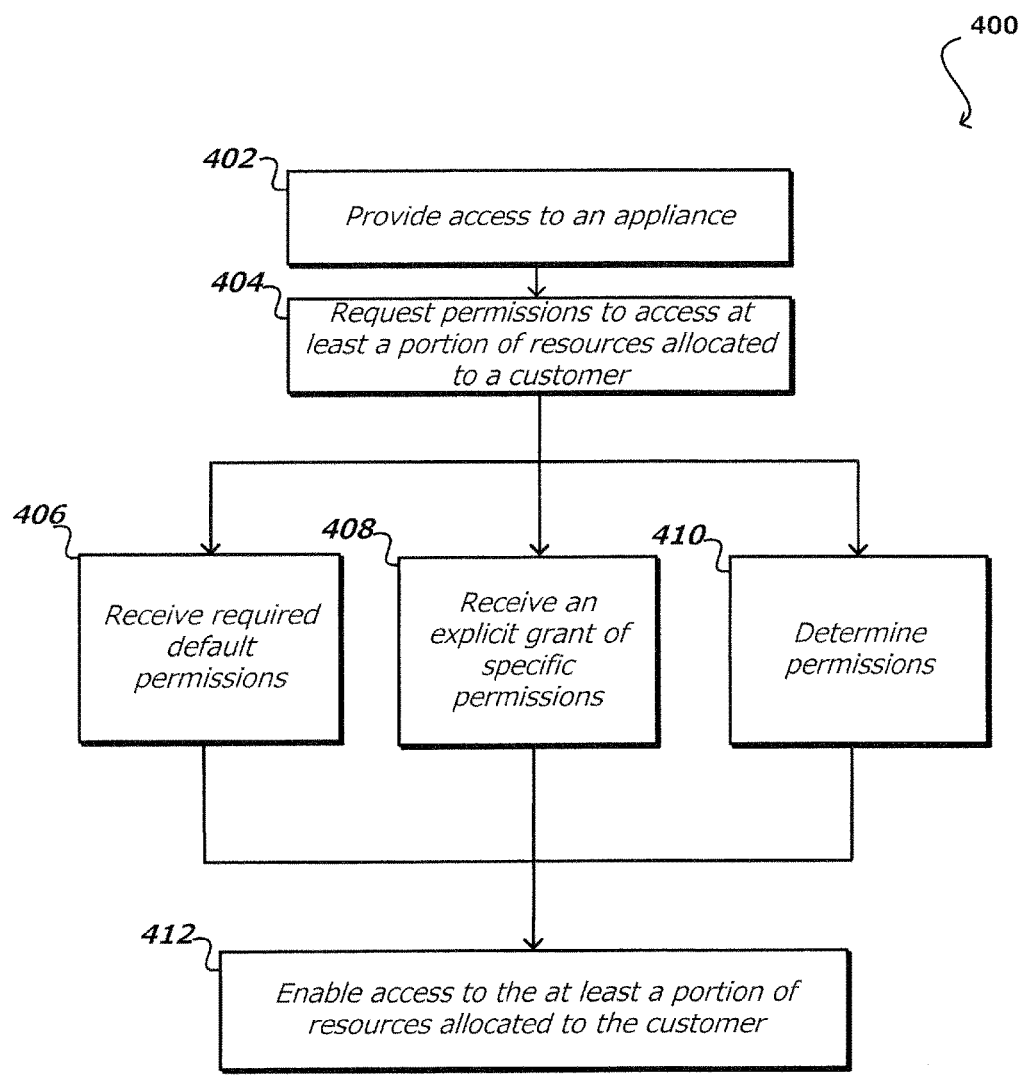
FIG. 4 illustrates an example process for enabling access to resources in accordance with an alternate embodiment.

FIG. 4. illustrates an example process 400 that can be used to enable a customer of a service provider to delegate access to one or more resources in accordance with an alternate embodiment. As described, a customer can have an account maintained by a resource provider of the one or more resources accessible to the customer as determined by one or more terms of the account. For example, in accordance with various embodiments, a resource provider environment can include one or more secured resources of various types, as may be used to support various services and/or applications. A customer of the service provider can obtain an account with the service provider, enabling the customer to access one or more of the secured resources, such as appliances, across at least one appropriate network in order to setup the appliances. In order to enable the appliance provider to obtain access to those resources, but be restricted to the amount or type of access that can be obtained, the developer can request permissions or other access rights to access at least a portion of the resources associated with a customer of the resource provider environment.

In accordance with various embodiments, an appliance provider might provide 402 an appliance that can be downloaded or otherwise accessed and executed by the customer or users of the customer. The appliance can be downloaded or otherwise obtained from an electronic marketplace. The appliance provider may need to utilize resources associated with the customer of the resource provider environment. In order to enable the appliance provider to obtain access to those resources, but be restricted to the amount or type of access that can be obtained, the developer can request 404 permissions or other access rights to access at least a portion of the resources associated with a customer of the resource provider environment. For example, when the appliance is provided to the electronic marketplace, the developer of the appliance can specify default permissions required of the appliance provider, as may include the resources that the appliance provider will access on behalf of the customer. In this situation, required default permissions are received 406.

In various embodiments, the customer can explicitly grant or otherwise specify specific permissions when the customer subscribes to the appliance. In this situation, explicitly granted permissions are received 408. In some embodiments, one or more rules can be evaluated to determine 410 a set of policies or permissions. The rules can take the form of code that is evaluated in the context of the permissions to determine the appropriate policy, could involve simple declarative rules with support for conditional statements, or could utilize variable substitution, among other such options. There can be different rules for different types of appliance providers or appliances provided by those providers, as well as paths through which requests for access take.

In some embodiments, a set of templates can be used to allow mapping between the appliance, actions the appliance will execute, and the permissions. An example template can allow access to a specified link (e.g., a URL for a storage resource). Instead of (or in addition to) templates, another approach can be based at least in part upon a set of rules. Other approaches to performing the mapping can be used as well, wherein information associated with the customer such as user preferences and identity information can be used.

The various information and attributes from the various sources can, in at least some embodiments, be passed through a rules engine that can output a document with one or more policies dictating what the appliance provider is allowed to do against the resources allocated to the respective customer. The rules engine might also be operable to manipulate other resources in the course of making that determination, such as reading or writing information to a data store for purposes such as quota maintenance or mapping updates, etc.

In accordance with various embodiments, as described, the subscription or access to the appliance can be based on, for example, whether or not the customer has canceled the subscription or stopped paying for use of the appliance. For example, an appliance provider who provides appliances for use by customers or their end users might allow each customer to obtain a certain type of access, or a certain amount of access. This can include, for example, up to an amount of data storage capacity or processing capacity, or up to a maximum cost of resource usage. The customer can also specify how to handle any requests that exceed those limits. For example, the customer could indicate that the user is responsible for paying for any access beyond the limit, or might not enable the user to obtain any access to the customer resources when the user has reached the limit. When the customer has an active subscription to an appliance allowing for such a subscription, the appliance provider can be granted the permissions to access resources associated with the customer. Thereafter, access to at least some resources allocated to the customer is enabled 412.

Figure 5:
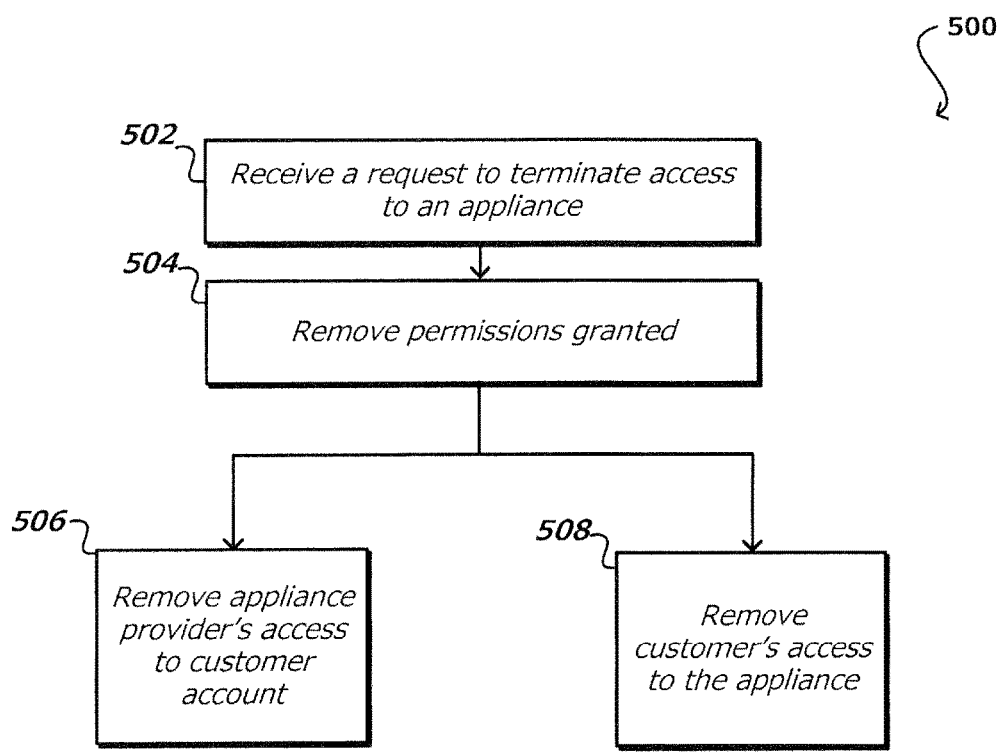
FIG. 5. illustrates an example process for enabling a customer of a resource provider to explicitly unsubscribe to an appliance and revoke access to resources associated with the customer's account in accordance with various embodiments.

FIG. 5. illustrates an example process 500 that can be used to enable a customer of a service provider to explicitly unsubscribe to an appliance and revoke access by an appliance provider to resources associated with the customer's account. As described, the customer can have an account maintained by a resource provider of the one or more resources accessible to the customer as determined by one or more terms of the account. An appliance provider can access the resources associated with the customer but may be restricted to certain operations or the amount or type of access that can be obtained. For example, the appliance provider may be granted permissions or other access rights to access at least a portion of the resources associated with a customer of the service provider to configure the appliance. In the situation where the customer no longer wants access to the appliance or otherwise wants to revoke the access granted to the appliance provider, the customer can explicitly unsubscribe from the appliance or, in some embodiments, delete the delegation profile used by the appliance provider.

For example, in accordance with various embodiments, the customer can explicitly unsubscribe from the appliance. This can include, for example, receiving 502, by an account management service, a request to terminate access to an appliance. Terminating access from the appliance can include, for example, requesting to the electronic marketplace to unsubscribe from the appliance, and the like. The request can be received at one of the service provider environment or the appliance provider. In response to receiving the request, permissions granted can be removed 504. Removing permissions granted can include, for example, removing 506 the appliance provider access to the customer account and removing 508 the customer's access to the appliance. In accordance with various embodiments, removing the appliance provider's access to the customer account can include deleting the delegation profile or removing permissions to the appliance provider to access the resources allocated to the customer by the service provider environment. In this way, the appliance provider is no longer granted access to resources allocated to the customer. Removing the customer's access to the appliance can include, for example, removing the reference to the appliance in the account of the customer, removing access to the appliance as may include login information, account information, customer information (e.g., name, billing information), etc.

Figure 6:
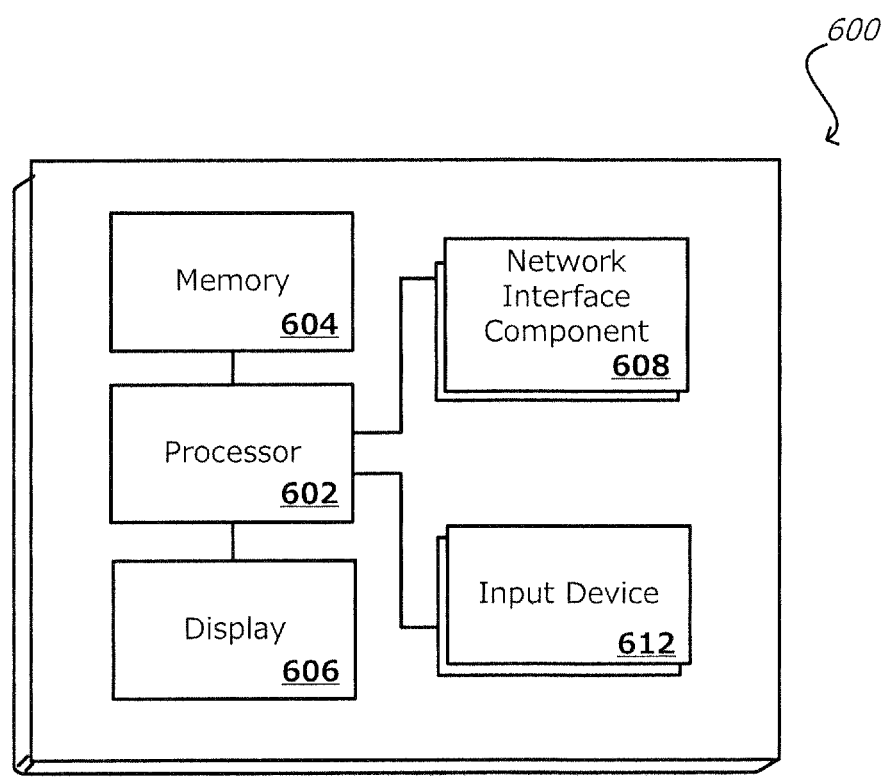
FIG. 6 illustrates a logical arrangement of a set of general components of an example computing device, in accordance with various embodiments.

FIG. 6 illustrates a logical arrangement of a set of general components of an example computing device 600. In this example, the device includes a processor 602 for executing instructions that can be stored in a memory device or element 604. As would be apparent to one of ordinary skill in the art, the device can include many types of memory, data storage, or non-transitory computer-readable storage media, such as a first data storage for program instructions for execution by the processor 602, a separate storage for images or data, a removable memory for sharing information with other devices, etc. The device typically will include some type of display element 606, such as a touch screen or liquid crystal display (LCD), although devices such as portable media players might convey information via other means, such as through audio speakers. The device can include one or more network interface components 608 configured to enable the device to transmit and receive information over a network. As discussed, the device in many embodiments will include at least one input element 612 able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device. In some embodiments, the computing device 600 of FIG. 6 can include one or more network interface elements 608 for communicating over various networks, such as a Wi-Fi, Bluetooth, RF, wired, or wireless communication systems. The device in many embodiments can communicate with a network, such as the Internet, and may be able to communicate with other such devices.

Figure 7:
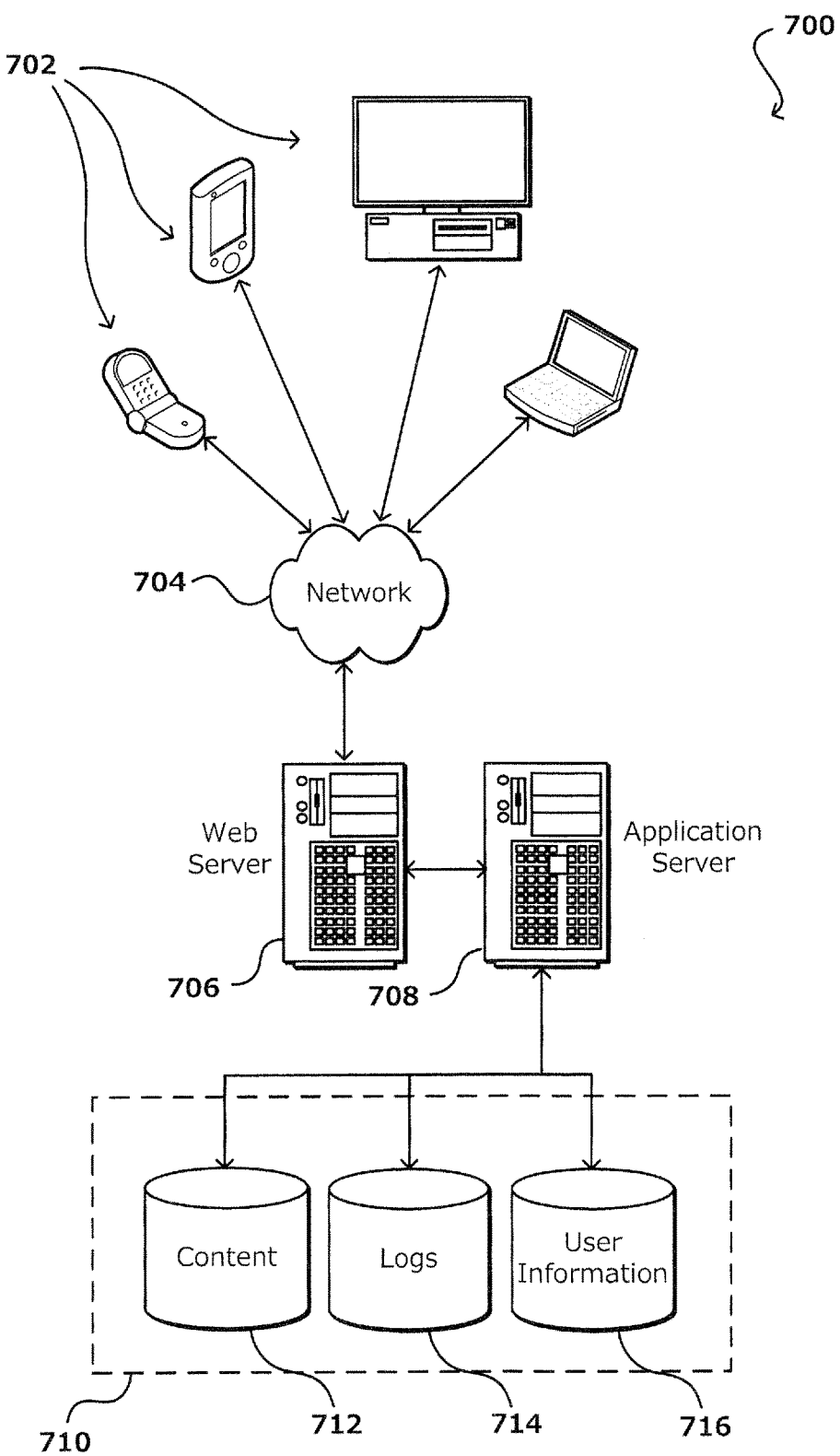
FIG. 7 illustrates an example of an environment for implementing aspects in accordance with various embodiments.

As discussed, different approaches can be implemented in various environments in accordance with the described embodiments. For example, FIG. 7 illustrates an example of an environment 700 for implementing aspects in accordance with various embodiments. As will be appreciated, although a Web-based environment is used for purposes of explanation, different environments may be used, as appropriate, to implement various embodiments. The system includes an electronic client device 702, which can include any appropriate device operable to send and receive requests, messages or information over an appropriate network 704 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 706 for receiving requests and serving content in response thereto, although for other networks an alternative device serving a similar purpose could be used, as would be apparent to one of ordinary skill in the art.

The illustrative environment includes at least one application server 708 and a data store 710. It should be understood that there can be several application servers, layers or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device 702 and the application server 708, can be handled by the Web server 706. It should be understood that the Web and application servers are not required and are merely example components, as structured code discussed herein can be executed on any appropriate device or host machine as discussed elsewhere herein.

The data store 710 can include several separate data tables, databases or other data storage mechanisms and media for storing data relating to a particular aspect. For example, the data store illustrated includes mechanisms for storing production data 712 and user information 716, which can be used to serve content for the production side. The data store also is shown to include a mechanism for storing log data 714. It should be understood that there can be many other aspects that may need to be stored in the data store, such as page image information and access rights information, which can be stored in any of the above listed mechanisms as appropriate or in additional mechanisms in the data store 710. The data store 710 is operable, through logic associated therewith, to receive instructions from the application server 708 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 702. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 7. Thus, the depiction of the system 700 in FIG. 7 should be taken as being illustrative in nature and not limiting to the scope of the disclosure.

Various embodiments discussed or suggested herein can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, JavaScript, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer system, comprising:
   at least one processor; and
   memory including instructions that, when executed by the at least one processor, cause the computer system to:
   receive an indication of a request to subscribe to an appliance by a customer, the appliance being provided by an appliance provider, the appliance being associated with a delegation profile, and the customer having a first level of access to a customer virtual network;
   enable the delegation profile based at least in part on the request for the customer to subscribe to the appliance, the delegation profile including an identifier, a validation policy that specifies the customer as being permitted to assume the delegation profile, and an authorization policy that specifies one or more permissions for accessing and utilizing one or more resources by the customer, the customer having an account maintained by a provider of the one or more resources accessible to the customer;
   receive, from the appliance provider, a request for a set of credentials to access the one or more resources associated with the account, the request including a reference to the delegation profile;
   verify that the customer is currently subscribed to the appliance; and
   provide the appliance provider with access to the one or more resources as set forth by the one or more permissions in the authorization policy, including a second level of access less than the first level of access to the customer virtual network, upon verification that the customer is subscribed to the appliance.

2. The computer system of claim 1, wherein the instructions when executed further cause the computing system to:
   in response to receiving the indication of the request to subscribe to the appliance, enable a license to use the appliance for at least a period of time.

3. The computer system of claim 2, wherein the instructions when executed further cause the computing system to:
   determine that the license to the appliance has expired; and
   disable use of the delegation profile.

4. The computer system of claim 1, wherein the instructions when executed to determine the one or more permissions further cause the computing system to:
   determine the one or more permissions by one of receiving an indication of a selection of the one or more permissions from the customer, using a default set of the one or more permissions, using a set of permissions requested by the appliance provider, determining at least one action to be performed by the appliance, or mapping the at least one action to at least one permission.

5. A computer-implemented method, comprising:
   receiving a request for credentials to enable a first party to make a change in virtual infrastructure associated with a second party to run an appliance, the virtual infrastructure having a first level of access to the second party virtual network;
   enabling the delegation profile based at least in part on receipt of a request from the second party to acquire the appliance, the delegation profile including an identifier, a validation policy that specifies the second party as being permitted to assume the delegation profile, and an authorization policy that specifies one or more permissions for the second party to access and utilize one or more resources;
   validating that the second party has been provided the appliance; and
   providing the credentials to the first party to access the virtual infrastructure associated with the second party, the access being subject to one or more permissions associated with the delegation profile and including a second level of access less than the first level of access to the second party virtual network, upon validation that the second party has been provided the appliance.

6. The computer-implemented method of claim 5, wherein validating that the second party has been provided the appliance further comprises:
   determining that the second party has a valid subscription to use the appliance.

7. The computer-implemented method of claim 5, further comprising:
   metering use of the appliance by the second party.

8. The computer-implemented method of claim 5, further comprising:
   receiving an indication of a request to use the appliance by the second party; and
   enabling a license to use the appliance for at least a period of time.

9. The computer-implemented method of claim 5, further comprising:
   receiving an indication that the second party is not permitted to access the appliance; and
   denying a request by the first party to obtain credentials to access the virtual infrastructure associated with the second party.

10. The computer-implemented method of claim 9, wherein the indication includes at least one of an indication that the second party no longer desires to use the appliance or an indication that a license period associated with a license to use the appliance has expired.

11. The computer-implemented method of claim 5, further comprising:
    determining an update of a license to use the appliance, the update corresponding to a change in at least one feature of the appliance; and
    adjusting at least one permission of the one or more permissions based at least in part on the update of the license.

12. The computer-implemented method of claim 5, wherein the one or more permissions are determined based at least in part on one or more rules that map determined actions of the appliance to one or more permission elements.

13. The computer-implemented method of claim 5, wherein the one or more permissions are determined by one of:
    receiving an indication of a selection of the one or more permissions from the second party;
    using a set of permissions requested by the second party;
    using a default set of the one or more permissions associated with the appliance in response to no permissions being received by the second party; or
    determining at least one action to be performed by the appliance and mapping the at least one action to at least one permission.

14. The computer-implemented method of claim 13, wherein the selection of the one or more permission is performed by one of a text input, a selection of a permission element in a drop-down menu, or detecting no input by the second party.

15. A non-transitory computer-readable storage medium including instructions that, when executed by at least one processor of a computing system, cause the computing system to:

receive a request from an appliance provider to configure resources of a customer of a service provider to run an appliance, the customer having a first level of access to a customer virtual network;

receive a request from the customer to purchase the appliance; and enable use of a delegation profile by the appliance provider, the delegation profile associated with an identifier, a validation policy that specifies the customer as being permitted to assume the delegation profile, and an authorization policy that specifies one or more permissions for accessing and utilizing one or more resources by the customer;

determine, using the delegation policy, that the appliance provider is authorized to configure the resources of the customer based at least in part on the customer having purchased a subscription to the appliance; and grant the request to configure the resources of the customer, including a second level of access less than the first level of access to the customer virtual network, upon determination that the customer has purchased a subscription to the appliance.

16. The non-transitory computer-readable storage medium of claim 15, wherein the instructions when executed further cause the computer system to:

determine that the customer has unsubscribed to the appliance; and disable use of the delegation profile by the appliance provider.

* * * * *